Patented Aug. 8, 1933

1,921,275

UNITED STATES PATENT OFFICE 1,921,275

PEANUT BUTTER AND PROCESS FOR MAKING THE SAME

Rudolf Werner, Maywood, Ill.

No Drawing. Application August 15, 1930, Serial No. 475,642. Renewed January 16, 1933

2 Claims. (Cl. 99—11)

My invention relates to nut butter and more particularly to peanut butter, and my main object is to produce a peanut butter which does not adhere to the palate when eaten.

A further object of the invention is to produce a peanut butter of stable consistency, and in which a separation of oils or other ingredients will not occur.

A still further object of the invention is to produce a peanut butter of rarefied yet firm consistency, whereby to assume an increased and constant volume.

Another object of the invention is to produce a peanut butter of a foamy and fluffy structure which lends itself readily for spreading on bread and for assimilation in the mouth.

An additional object of the invention is to confine the product to the basic ingredients customarily employed, such as ground peanuts and a vegetable oil, and to add no extraneous ingredient or adulterant.

A significant object of the invention is to subject the basic compound to a novel process of agitation and rarefication involving a relatively simple apparatus.

A final but nevertheless important object of the invention is to produce the peanut butter by a method and means entailing a minimum of operation and expense.

In the development of my invention, I have found that various means and methods have been employed to improve peanut butter toward stability and to suit the palate. Thus, efforts were made to keep the product from becoming rancid, to prevent the oil content thereof from separating, and to free the product from tendencies to adhere to the palate. Whatever claims were made for the means and methods referred to, I have found that extraneous ingredients and processes were employed in most instances to attain the desired result, making the production of the peanut butter more or less involved and more expensive than is warranted by the class of and the demand for the product. Consequently, it has been my intention to develop the novel product by a means and method of utter simplicity and without adulteration, to result in a commodity which may be sold at even lower cost than the standard product.

In carrying out the invention, the peanuts—or any other kind of nuts—are roasted and blanched as usual. For my purpose, the peanuts are not ground as usual, but to a much finer degree, as I desire the maximum amount of contact and combination on the part of the peanut mass with the coacting ingredient. This ingredient is a vegetable oil or fat such as cocoanut oil.

It might be assumed that by very finely grinding the peanuts the result is a pasty mass rather than a finely granular substance, and that the pastiness of the mass is what causes the same to cling to the roof of the mouth when the peanut butter is eaten. However, for my purpose the mass by its finely ground consistency becomes more fully combined with the vegetable oil when the two ingredients are united. The ingredients are, of course, united in such proportions as to result in a smooth butter, less of the vegetable oil being used if the peanuts have a higher oil content.

In order to more fully commingle the above ingredients, and to secure the novel product anticipated, I force the compound thereof through a mill comprising two closely-set disks, one of which is stationary and the other of which rotates rapidly. The effect of this mill upon the compound is to mix and whip it, whereby to produce a fluffy, loose and foamy substance. The action of the mill commingles the ingredients in a rarefied state and so thoroughly by the high speed of the rotating disk that the resulting compound is a new product of a stable nature. It is a new peanut butter of larger volume owing to its rarefied consistency and stability because the cells of the butter and of the oil are thoroughly blended by the mixing process. Under ordinary conditions and temperatures, the new product does not change in body or form. When it is eaten, it melts in the mouth, like ice cream, and owing to its new consistency does not cling to the palate or present any resistance to assimilation with the digestive secretions.

It will be apparent from the nature of the ingredients used—animal oils or fats may be substituted for vegetable oils or fats—that the novel peanut butter is a product of low cost, since the volume gained by the compounding of the ingredients is even greater than would be secured in the old way, and the cost of the oil is, therefore, more than covered in the resulting compound product. The consistency of the product makes it easy to spread, since it has a velvety, smooth appearance. It may be packed in jars as is the usual practice, and will stand indefinitely without change or deterioration.

I claim:—

1. The method of producing a nut butter consisting of combining finely-ground nuts with an oil, and whipping the compound to a foamy consistency.

2. A nut butter comprising a compound of finely-ground nuts and an oil, said compound having a foamy consistency.

RUDOLF WERNER.